Sept. 28, 1965 A. G. BUCK ETAL 3,209,352

SYSTEM FOR ELECTRONIC PICTORIAL POSITION COMPARISON

Filed Dec. 28, 1955 2 Sheets-Sheet 1

INVENTORS
ANDRE G. BUCK
FREDERICK W. KRUSE, JR.

BY R. I. Tompkins

ATTORNEYS

SYSTEM FOR ELECTRONIC PICTORIAL POSITION COMPARISON

Filed Dec. 28, 1955

2 Sheets-Sheet 2

INVENTORS
ANDRE G. BUCK
FREDERICK W. KRUSE, JR.

BY R. S. Tompkins
ATTORNEYS

United States Patent Office 3,209,352

Patented Sept. 28, 1965

3,209,352

SYSTEM FOR ELECTRONIC PICTORIAL POSITION COMPARISON

Andre G. Buck, 12623 Valley View, Los Altos, Calif., and Frederick W. Kruse, Jr., 3230 Ross Road, Palo Alto, Calif.

Filed Dec. 28, 1955, Ser. No. 556,024
9 Claims. (Cl. 343—7)
(Granted under Title 35, U.S. Code (1952), sec. 266)

Figure 1:
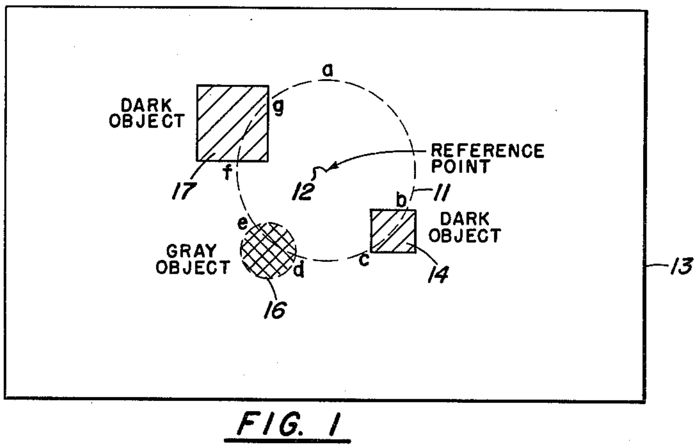

The invention described herein may be manufactured and used by or for the Government of the United States of America for governmental purposes without the payment of any royalties thereon or therefor.

The present invention relates to a system and method for electronic pictorial position comparison and more particularly to a system and method for electronic pictorial position comparison in which a process of identification and location of a particular point or points is carried out by suitable scanning of arbitrary and reference displays.

The necessity for final approach guidance systems for bombs and missiles, particularly those of long-range capability, to diminish the circle of confusion and increase the probability of a hit is well recognized. Prior methods utilized in final approach guidance systems included: astronavigation, which presently is not capable of sufficient accuracy to locate a missile within one-quarter mile of a target; loran and radio navigation, which are extremely vulnerable to jamming and require high-power sending stations in operation within a few hundred miles of the target; beam-rider methods, which are also vlunerable to jamming and in addition require a control aircraft in the target vicinity that has means of identifying and locating the target as well as appropriate beam-sending equipment; seeking sights, for heat, smoke, metal, light, color, etc., have an operation which is based solely upon presence or absence of the sought quantity which, in general, is insufficient information for target identification in complex arrangements; remote control of the missile, which is vulnerable to jamming if radio is employed and requires communication equipment on the missile as well as a controlling station or aircraft in the vicinity of the target; target modification by transpondors, reflectors, etc. to permit identification for an appropriate automatic sight, which is not always practical and lasting for enermy targets; and the method employed in the television homing system described by Capt. J. E. Libbert and Dr. Werner Rambauske in their Wright Field report, "A German Television Homing System," Headquarters Air Materiel Command Technical Report F-TR-2161-ND, GSAAF Wright Field No. 24, which is utilizable for simple targets only since the only source of information is presence or absence of the target.

In the present system and method, information regarding the picture or target to be encountered is stored in a memory device before the flight operation and is employed to produce a reference signal or a reference display from which the reference signal is obtained. During flight a target or arbitrary display is presented to the system by means of radar, infrared, optical or other means and a continuous systematic, rapid search of the target area is conducted. Whenever during the search the portion of the target area that agreeds with the stored information is encountered, an electrical output is produced which gives the location of the identified point relative to the same point in the reference display. This location output can be utilized to feed control-surface servos to bring a missile to an "on target" course or merely utilized to give an indication for non-missile applications. The process of identification and location of a particular point or points is carried out by suitable scanning of the arbitrary and the reference displays. The scanning is accomplished electronically so that the single scan process is completed fast enough to permit rapid repetition and hence use under dynamic conditions. It is thus seen that this system and method are capable of automatically performing identification and location processes for a complex array of objects in a self-contained unit requiring no external control. Its only external source of information need be an unmodified pictorial presentation of target area. It is essentially fail-safe since in the absence of agreement between the arbitrary and reference displays, no output signal is produced and the missile, for example, would continue as aimed. The system is relatively incomplex electronically since no synchronizing signals are employed and the required waveforms can be produced with a minimum number of tubes and components. It is essentially jamproof by artificial means. A dense smoke screen over the entire target could be effective for an optical sight arrangement, but infrared or radar sensitive pickups could eliminate this possibility.

Accordingly, an object of the present invention is the provision of a final approach guidance system and method that are essentially jamproof.

Another object is to provide a final approach guidance system that is incomplex and is an entirely self-contained unit requiring no external control.

A further object of the invention is the provision of a system and method for automatically performing identification and location processes for a complex array of objects.

Still another object is to provide a system and method for comparing an arbitrary display with a reference display and for producing an output signal when similarity between the displays is detected.

A still further object of the present invention is the provision of a system for utilization with a missile for producing an output signal that can be fed to control-surface servos to bring the missile to an "on target" course.

Figure 2:
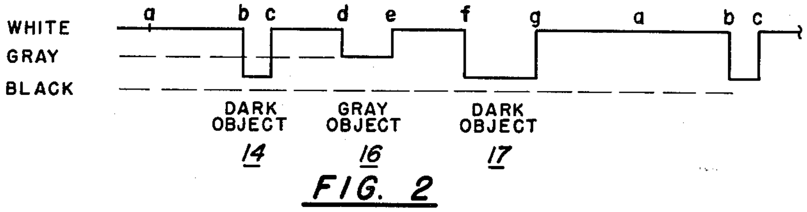
Figures 3, 4:
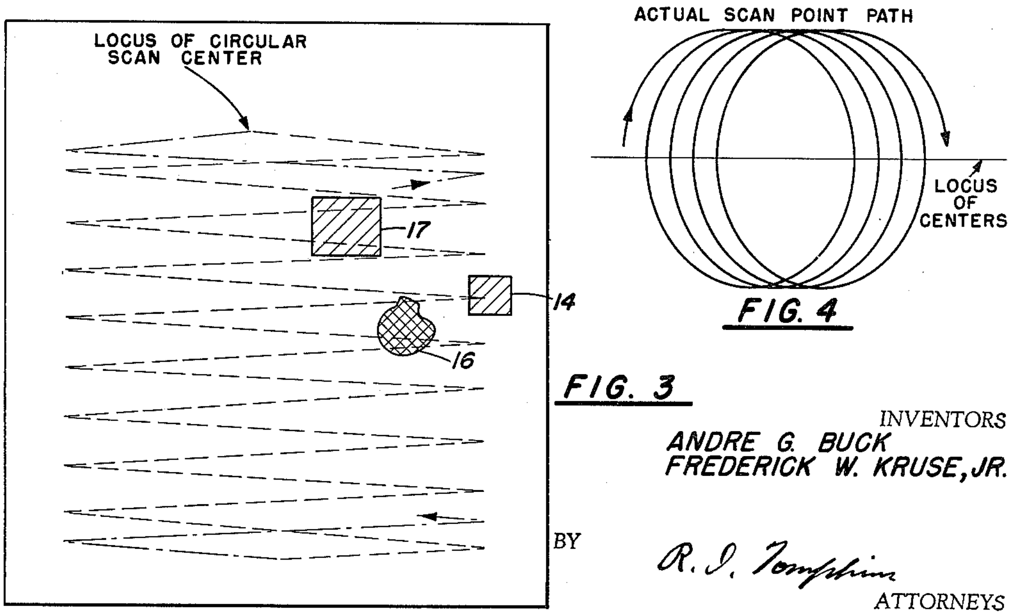
Figure 5:
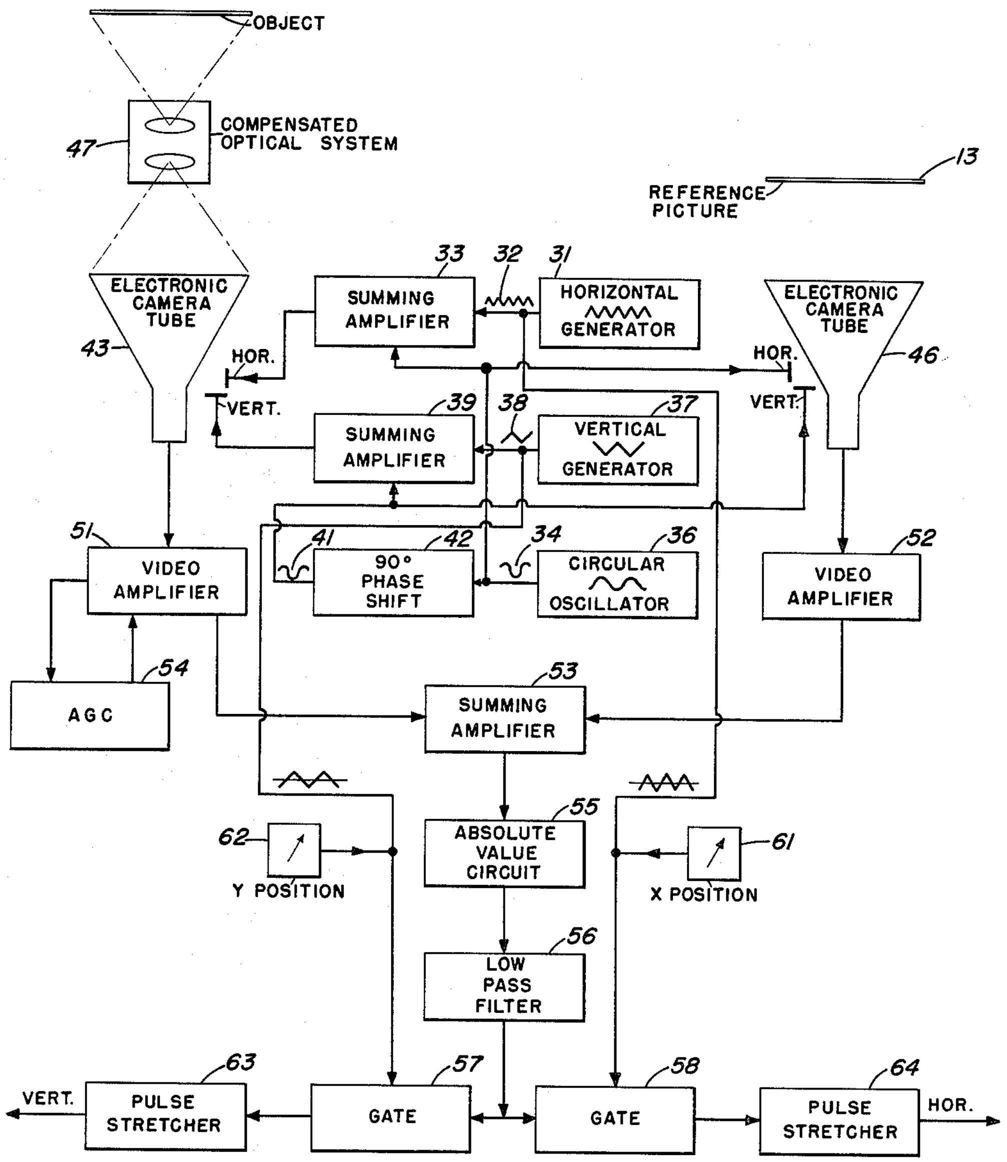
Figure 6:
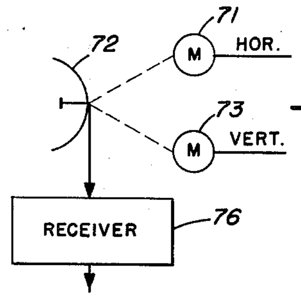

Other objects and many of the attendant advantages of this invention will be readily appreciated as the same becomes better understood by reference to the following detailed description when considered in connection with the accompanying drawings wherein:

FIG. 1 shows a reference display for use with the present invention and the scan of that display, FIG. 2 illustrates a graph of the electrical output representing the light intensity variations encountered by the scan of FIG. 1, FIG. 3 shows the scan employed on the arbitrary display, FIG. 4 illustrates the actual scan path of the arbitrary scan, FIG. 5 is a block diagram of a preferred embodiment of the invention, and FIG. 6 shows a schematic representation of a radar pickup device.

Referring now to the drawings, wherein like reference characters designate like or corresponding parts throughout the several views, there is shown in FIG. 1 the scan employed on the reference display. The scan consists of a point moving continuously in a circular path 11 around the reference point 12 as center on a reference display card 13. The areas 14, 16 and 17 represent buildings, trees or other objects that are in the desired target region and which are intercepted by the scan at points *b* through *g*, inclusive. Card 13 is preferably a photographic negative or slide of the target scene, an image of which is focused on the mosaic surface of an iconoscope, orthicon, or some other pickup device that will convert the image into corresponding electrical signals. The circular scan 11 is produced by a cathode-ray beam within the reference pickup device. An electrical output representing the light intensity variations encountered along the path by the scanning point are shown in FIG. 2.

The electrical signals produced by the pickup device are repeated continuously as the scanning point repeats its traverse of the circular path. It is apparent from FIG. 2 that the electrical output from the pickup device is a function of the color, size, and shape of the objects encountered by the scan.

The scan employed on the arbitary display, which is a display of the observed region, is basically the same as that used on the reference, except that the circular path is moved systematically and relatively slowly about the entire field of view. Continuous searching for the points of interest is thereby accomplished. The locus of points representing the center of the circular path is shown in FIG. 3. A relatively slow, uniformly varying horizontal sweep moves the circular scan back and forth across the field of view while an even slower vertical sweep gradually moves it upward and downward. The locus of center thus spans the field in a series of nearly horizontal lines much like a television sweep. The circular and horizontal spot motion results in essentially a cycloidal sweep, as indicated in FIG. 4. The moving point never travels in a perfect circular path because of the added uniformly varying horizontal and vertical motion. However, by appropriate distortion of the reference path it can be made to resemble, within tolerances, one of the loops in the cycloid. When a loop of the cycloid coincides with the position of the loop on the reference scan, the electrical output from the two displays will be equal; but, in general, the electrical outputs will differ for all other cycloid loop positions on the arbitary scan. With circuiting that gives the low-speed horizontal and vertical sweep voltages of the pickup devices at the instant of coincidence of the electrical outputs, the process of identification and location is completed.

In FIG. 5 a basic system of the present invention is shown in block diagram form since suitable circuits for the block diagram components are well known in the art. Horizontal generator 31 generates a triangular sweep voltage wave 32 which is added in summing amplifier 33 to a sine wave 34 generated by oscillator 36. Vertical generator 37 generates a triangular sweep voltage wave 38 that is added in summing amplifier 39 to cosine wave 41, which is obtained by phase-shifting sine wave 34 by 90 degrees in phase shifter 42. The outputs of summing amplifiers 33 and 39 are applied, respectively, to the horizontal and vertical deflection plates of the arbitrary display electronic camera tube 43. The sine wave 34 and cosine wave 41 are conducted directly to the horizontal and vertical deflection plates, respectively, of the reference display electronic camera tube 46. The image of the reference picture card 13 is scanned by the cathode ray beam in tube 46, which due to the presence of 90 degrees phase shifted sine waves on the horizontal and vertical deflection plates, moves in a circular path as is shown in FIG. 1. The complex detail of the ground below is imaged by optical system 47 on the arbitrary display electronic camera tube 43 and is scanned by a cathode ray beam in a manner shown in FIG. 3. Video outputs from tubes 43 and 46 are amplified and arranged for opposite polarity, respectively, by video amplifiers 51 and 52 and their sum taken in summing amplifier 53. An automatic gain control (A.G.C.) circuit 54 is utilized for stabilization of the arbitrary wave to a value essentially equal to the reference wave. At any instant of equality the arbitrary and reference waves thus cancel each other in summing amplifier 53; however, only during the coincidence loop does the cancellation persist for any extended interval. Over all other portions of the field of view, cancellations will be incomplete and an average value of signal will result. Absolute value circuit 55 converts all difference signals to one polarity and low pass filter 56 removes much of the variations to obtain, essentially, the average value. Proper choice of filter response will result in approximately zero output during coincidence and some average output at all other times. This drop in average level constitutes a pulse at coincidence which is used to control gate circuits 57 and 58. It is evident that for any one value of sweeping voltage wave 32 and for any one value of sweeping voltage wave 38 there is only one corresponding position of the cathode ray tube beam in tube 43; or in other words, the instantaneous values of waves 32 and 38 are a measure of the position of the beam. Thus, if the values of waves 32 and 38 can be ascertained at the time of coincidence between the arbitrary and reference displays, then the horizontal and vertical displacement of the coincident arbitrary area can be determined with respect to the reference area. The $x$ position element 61 and the $y$ position element 62 are potentiometers which are employed to bias, respectively, wave 32 and wave 38 to set their average values to zero so that the outputs from gates 58 and 57, which are the gate waves 32 and 38, have magnitudes and polarities representing the $x$ and $y$ distances between the points on the reference and arbitrary displays. Pulse stretchers 63 and 64 increase the duration of the output pulses from gates 57 and 58, respectively, so that these pulses have the proper shape to operate the vertical and horizontal surface servos. The $x$ and $y$ position potentiometers, 61 and 62, effectively bias the output pulses so that they represent distances from some other reference point in the field of view although the original reference point was used to obtain these distances. The output of these potentiometers, for example, could be replaced by coordinate outputs from a computer which is supplying lead into a control situation. Although it is evident that there are many suitable values for the frequencies of waves 32, 34, 38, and 41, calculations for illustrative values will now be considered.

An impulse of duration $t$ requires a bandwith B in any circuit through which it passes if the impulse is to be detected at the output. The relation between $t$ and B is roughly $t=1/B$. The numerator is more nearly 0.7 in practice, but for simplicity it is given the value 1.0. A maximum practical bandwith attainable only with great care in conventional amplifiers is nominally 10 megacycles per second. Thus, $t=1/1\times10^7=1\times10^{-7}$. Suppose $t$ represents $1/100$ or 1 percent of the time required to move the spot one revolution of the circular scan. This means there is a limiting resolution of 3.6 degrees (±1.8 degrees) around the cricle. The period $Tc$ of the circular scan thus is $100t$ or $1\times10^{-5}$ seconds. The frequency of wave 34 and 41, which is the circular sweep frequency, would be $1/Tc$ or 100 kc. The horizontal sweep wave 32 and the vertical sweep wave 38 are chosen to be triangular in waveform since that waveform reduces synchronization problems. If 100 circles are allowed along any horizontal line of the arbitary display, the frequency of the horizontal sweep wave 32 will be 500 c.p.s. This is seen from the fact that one cycle of wave 32 includes two horizontal lines, one across and one back, and thus in one period of the horizontal sweep there are 200 circles so $Th=200\times Tc$ or $2\times10^{-3}$. The frequency of wave 32 is $1/Th$ or 500 c.p.s. If 100 horizontal lines, 50 on the way down and 50 on the way up, are desired, the vertical sweep frequency will be 10 c.p.s., since there are two horizontal lines in one period of the horizontal sweep and thus 50 horizontal sweeps to one vertical sweep.

One hundred line resolution has been used as a representative figure. This means, for example, a theoretical accuracy of ±0.1 mile, or, roughly, 500 feet for a viewed area of 10 miles square. A practical accuracy might be between 1000 and 1500 feet for the same area. More generally a practical accuracy for a 100-line system is between 1 and 2 percent of the dimensions of the field of view.

The sampling rate of 10 c.p.s. may be too fast or slow, depending upon the particular application of the present system. Dynamic movements with frequency components out to 30 percent of the sampling rate can be effectively followed with enough precision for controlling purposes. Higher sampling rates can be obtained only by higher operating frequencies or less resolution. Conversely, lower sampling rates would permit somewhat higher resolution or lower operating frequencies. If rotational in addition to translational displacements must be resolved, for 3.6 degrees resolution, the output solution rate would be reduced by another factor of 100 or 0.1 c.p.s., in the 100-line system. This, in general, would be too slow for most dynamic situations but quite satisfactory for the pseudostatic.

As previously mentioned, the arbitary pickup device may be of the optical type shown in FIG. 5 or of other types such as infrared, radar, etc. In FIG. 6, there is shown a schematic diagram of a suitable radar pickup device for which the connections into the block diagram of FIG. 5 are apparent. The output of summing amplifier 33 of FIG. 5 woupld energize motor 71 which drives radar antenna 72 in a horizontal direction and the output of summing amplifier 39 would energize motor 73 which is connected to drive antenna 72 in a vertical direction. Of course, a receiver 76 would be required to detect, amplify, and demodulate the received echo waves before they could be conducted to video amplifier 51.

It is also to be realized that the camera reference pickup device shown in FIG. 5 could be replaced by a purely electronic memory circuit or by another electromechanical device such as a magnetic tape system. Equivalent components for all of the elements shown in FIG. 5 are well known in the art, and the choice of particular components will depend upon the specific application for which the system is utilized.

Some applications of the present system which are immediately apparent are: optical sighting, film reading, sighting from radar displays, as well as the previously mentioned missile guidance application. The system has many assets, one of which is its electronic incomplexity. The waveforms required are producible with a minimum of tubes and components and permit the utilization of transistors and germanium diodes in some of the circuits. Also, the use of the recently developed "Vidicon" cathode ray tubes should result in a compact electronic unit which possibly can be held to less than a 2 cubic foot volume.

Obviously many modifications and variations of the present invention are possible in the light of the above teachings. It is therefore to be understood that within the scope of the appended claims the invention may be practiced otherwise than as specifically described.

What is claimed is:

1. A position comparator comprising: means for producing a scanning beam to scan an arbitrary display and for producing an arbitrary wave that is a function of the physical features of the objects in the arbitrary display, means for producing a reference wave that is a function of the physical features of objects in a reference display, means for comparing said reference wave and said arbitrary wave and for producing a gate pulse when the two waves are similar, means for producing a first voltage that is a function of the instantaneous horizontal position of said scanning beam and for producing a second voltage that is a function of the instantaneous vertical position of said scanning beam, and means responsive to said gate pulse for gating said first and second voltages.

2. A position comparator comprising: scanning means for comparing an arbitrary display and a reference display and for producing a gate pulse upon similarity of the two displays, means for producing position voltages that are functions of the positions of said scanning means, and means responsive to said gate pulse for gating said position voltages.

3. A position comparator comprising: scanning means for systematically scanning an arbitrary display and for producing an arbitrary wave that is a function of the physical aspects of the area being scanned, means for producing a reference wave that is a function of the physical aspects of some small area in a reference display, means for producing a gate pulse upon similarity of said arbitrary and reference waves, means for producing a position voltage that is a function of the position of the small areas being scanned by said scanning means, and means responsive to said gate pulse for gating said position voltage.

4. A position comparator for locating the position of a reference display that is contained in an arbitrary display, said comparator comprising: reference means for producing a reference wave that is a function of a reference display, arbitrary pickup means for systematically scanning an arbitrary display and for producing an arbitrary wave that is a function of the arbitrary display, means for inverting said arbitrary wave, means for producing a gate wave that is the summation of said reference wave and the inverted arbitrary wave, means for producing a position wave that is a function of the position of the objects being scanned in the arbitrary display, and means responsive to said gate wave for gating said position wave.

5. A position comparator for producing voltages that are a function of the position of reference matter contained in an arbitrary display, said comparator comprising: reference means for producing a reference wave whose amplitude is a function of the size, shape, and shade of said reference matter; first generator means for producing a first sweep voltage wave; second generator means for producing a second sweep voltage wave; scanning means responsive to said first and second sweep voltages for scanning said arbitrary display and for producing an arbitrary wave whose amplitude is a function of the size, shape, and shade of the matter in said arbitrary display; inversion means for producing an inverse relationship between said reference wave and said arbitrary wave; summing means connected to the output of said inversion means for producing a gate wave that is the summation of the reference and arbitrary waves, a first output terminal; a second output terminal; a first gate responsive to said gate wave, only when it is of zero magnitude, for conducting said first sweep voltage to said first output terminal; a second gate responsive to said gate wave, only when it is of zero magnitude, for conducting said second sweep voltage to said second output terminal.

6. The position comparator of claim 5 wherein said reference means comprises a reference picture negative and a reference electronic camera tube for scanning an image of said reference picture negative.

7. The position comparator of claim 6 wherein said scanning means comprises an electronic camera tube.

8. The position comparator of claim 7 and circular sweep means connected to said reference electronic camera tube for producing a circular scan, and summation means for superimposing the output from said circular sweep means upon said first and second sweep voltage waves whereby the scan of said arbitrary electronic camera tube is cycloidal in nature.

9. The position comparator of claim 6 wherein said scanning means comprises a radar system.

References Cited by the Examiner

UNITED STATES PATENTS

| | | | |
|---|---|---|---|
| 2,648,723 | 8/53 | Goldsmith | 88—14 |
| 2,679,636 | 5/54 | Hillyer | 88—14 |
| 2,764,698 | 9/56 | Knight | 315—9 |

LEWIS H. MYERS, *Primary Examiner.*

NORMAN H. EVANS, *Examiner.*